(12) United States Patent
Urban et al.

(10) Patent No.: US 8,006,727 B1
(45) Date of Patent: Aug. 30, 2011

(54) PROTECTIVE COVER/SHIELD FOR WOODWORKING EQUIPMENT

(75) Inventors: Marc Urban, Everson, WA (US); Paul Akers, Bellingham, WA (US)

(73) Assignee: Fastcap, LLC, Bellingham, WA (US)

( * ) Notice: Subject to any disclaimer, the term of this patent is extended or adjusted under 35 U.S.C. 154(b) by 106 days.

(21) Appl. No.: 12/409,309

(22) Filed: Mar. 23, 2009

Related U.S. Application Data

(60) Provisional application No. 61/070,283, filed on Mar. 21, 2008.

(51) Int. Cl.
*B27G 19/00* (2006.01)
*B27G 21/00* (2006.01)

(52) U.S. Cl. .................. 144/329; 144/251.1; 144/252.1; 83/440.2; 451/451; 451/457

(58) Field of Classification Search .... 144/251.1–251.3, 144/252.1, 252.2, 359, 329; 409/137; 451/451, 451/457; 83/440.2
See application file for complete search history.

(56) References Cited

U.S. PATENT DOCUMENTS

| | | | | |
|---|---|---|---|---|
| 782,392 | A | * | 2/1905 | Harris ..................... 144/251.2 |
| 3,204,499 | A | * | 9/1965 | Schoenrock ................ 82/152 |
| 3,824,890 | A | * | 7/1974 | Zettler et al. ............... 409/134 |
| 4,034,633 | A | * | 7/1977 | Petersen ..................... 82/152 |
| 4,253,362 | A | | 3/1981 | Olson |
| 4,440,054 | A | * | 4/1984 | Elhaus ........................... 83/390 |
| 4,576,072 | A | | 3/1986 | Terpstra et al. |
| 4,848,423 | A | * | 7/1989 | Yoder ......................... 144/24.12 |
| 4,875,398 | A | | 10/1989 | Taylor et al. |
| 5,084,972 | A | | 2/1992 | Waugh |
| 5,158,001 | A | | 10/1992 | Udelhofen et al. |
| 5,597,023 | A | * | 1/1997 | Heintzeman ............... 144/204.2 |
| 5,819,619 | A | | 10/1998 | Miller et al. |
| 6,164,881 | A | | 12/2000 | Shono |
| 6,439,645 | B1 | | 8/2002 | Pedersen |
| 6,532,643 | B2 | | 3/2003 | Wang |
| 6,796,208 | B1 | | 9/2004 | Jorgensen |
| 2002/0189415 | A1 | | 12/2002 | Oktavec et al. |
| 2004/0060405 | A1 | | 4/2004 | Kao |

OTHER PUBLICATIONS

Rousseau Co., "Downdrafter", Web site http:/www.rousseauco.com/downdrafter/index.htm, 2003, 2 pages.

* cited by examiner

*Primary Examiner* — Shelley Self
(74) *Attorney, Agent, or Firm* — Michael R. Schacht; Schacht Law Office, Inc.

(57) ABSTRACT

A hood assembly for woodworking equipment, the hood assembly having a main frame member, at least one secondary frame member, a hood member, and first and second mounting members. Each secondary frame member is supported relative to the main frame member. The hood member is supported by the main frame member and the at least one secondary frame member. The main frame member is supported by the first and second mounting members. The main frame member and the at least one secondary frame member support the hood member such that the hood member extends over at least a portion of the woodworking equipment.

20 Claims, 15 Drawing Sheets

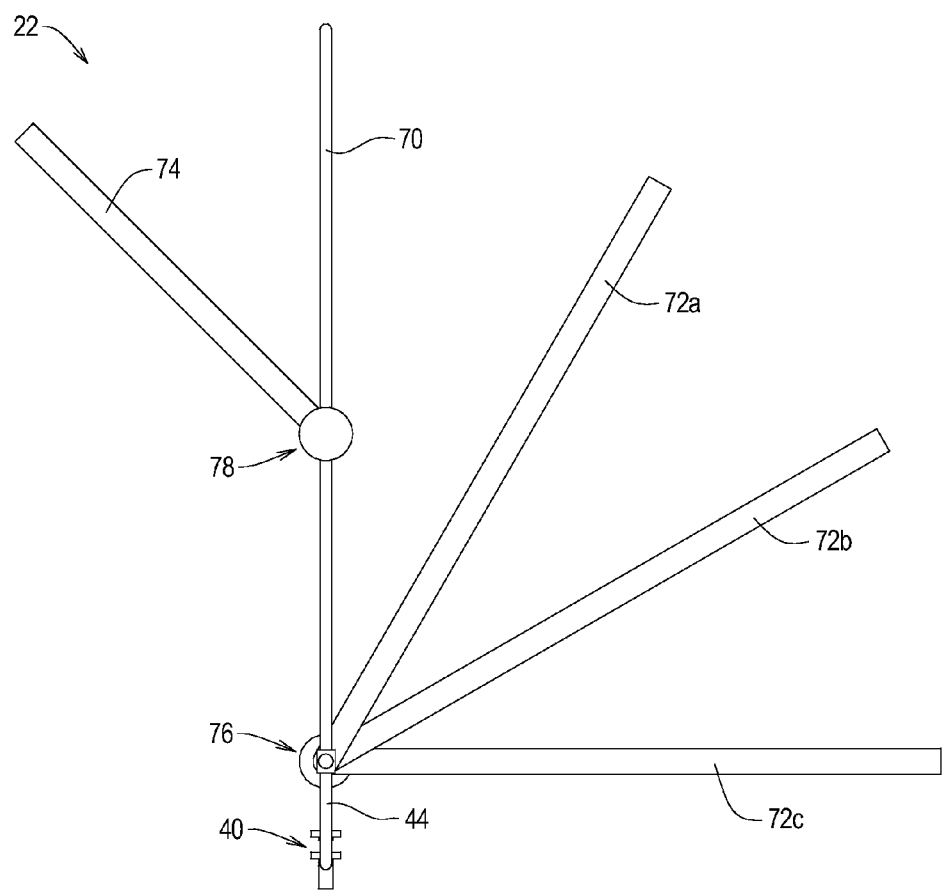

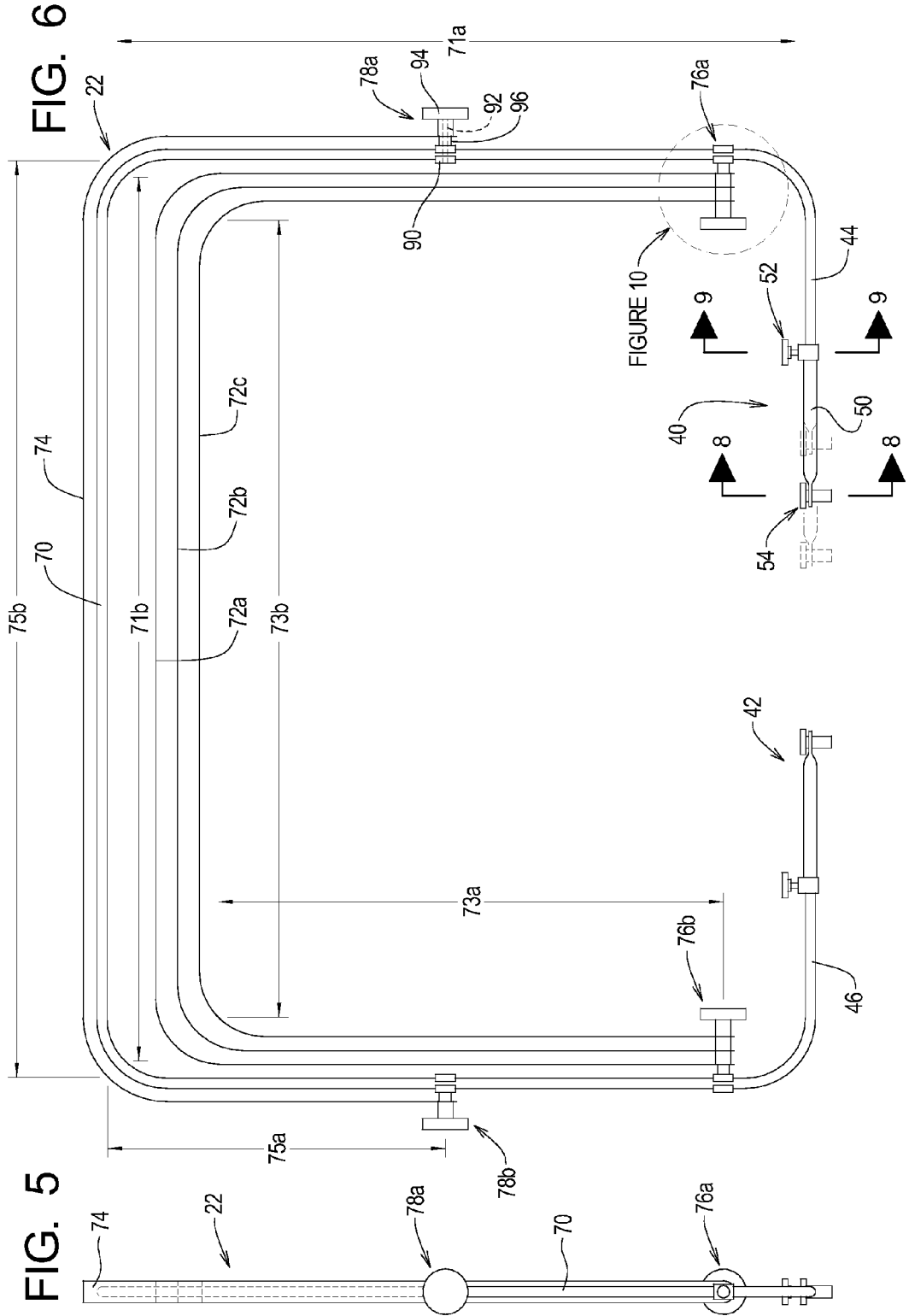

PROTECTIVE COVER/SHIELD FOR WOODWORKING EQUIPMENT

RELATED APPLICATIONS

This application claims benefit of U.S. Provisional Patent Application Ser. No. 61/070,283 filed Mar. 21, 2008.

The subject matter of the foregoing related application is incorporated herein by reference.

TECHNICAL FIELD

The present invention relates to systems and methods for collecting waste and, more particularly, to covers configured to collect saw dust from woodworking equipment.

BACKGROUND

Woodworking equipment generates often generates sawdust. In a shop environment, vacuum systems may be used to remove sawdust generated while the woodworking equipment is operating. Outside of a shop environment, however, the use of vacuum systems may not be possible or convenient.

Accordingly, if the woodworking equipment is used in a closed environment not dedicated to the operation of woodworking equipment, the operation of the woodworking equipment can contaminate the closed environment. If the woodworking equipment is placed outdoors, the woodworking equipment can get wet.

The need thus exists for portable systems and methods that can reduce the mess made by operating woodworking equipment and/or prevent the woodworking equipment from getting wet if used outdoors.

SUMMARY

The present invention may be embodied as a hood assembly for woodworking equipment defining first and second mounting locations, the hood assembly comprising a main frame member, at least one secondary frame member, a hood member, and first and second mounting members. Each secondary frame member is supported relative to the main frame member. The hood member is supported by the main frame member and the at least one secondary frame member. The main frame member is supported by the first and second mounting members. The first and second mounting members are adapted to be supported by the first and second mounting locations. With the first and second mounting members supported by the first and second mounting locations, the main frame member and the at least one secondary frame member support the hood member such that the hood member extends over at least a portion of the woodworking equipment.

The present invention may also be embodied as a method of covering woodworking equipment defining first and second mounting locations comprising the following steps. A main frame member and at least one secondary frame member are provided. Each secondary frame member is supported relative to the main frame member. A hood member is arranged on the main frame member and the at least one secondary frame member. The main frame member is supported relative to the first and second mounting members. The first and second mounting members are arranged such that the first and second mounting members are supported by the first and second mounting locations. With the first and second mounting members supported by the first and second mounting locations, the main frame member and the at least one secondary frame member are arranged such that the hood member extends over at least a portion of the woodworking equipment.

BRIEF DESCRIPTION OF THE DRAWINGS

FIG. 4 is a side elevation view of a frame structure of the first example hood in an extended configuration;

FIG. 5 is a side elevation view of the frame structure of the first example hood in a collapsed configuration;

FIG. 6 is an elevation view of the frame structure of the first example hood in the collapsed configuration;

FIG. 13 is an elevation view of a support structure of a second example hood that may be configured to collect waste created by a power saw or the like;

FIG. 23 is an elevation view of a support structure of a third example hood that may be configured to collect waste created by a power saw or the like;

DETAILED DESCRIPTION OF THE INVENTION

Figure 1:
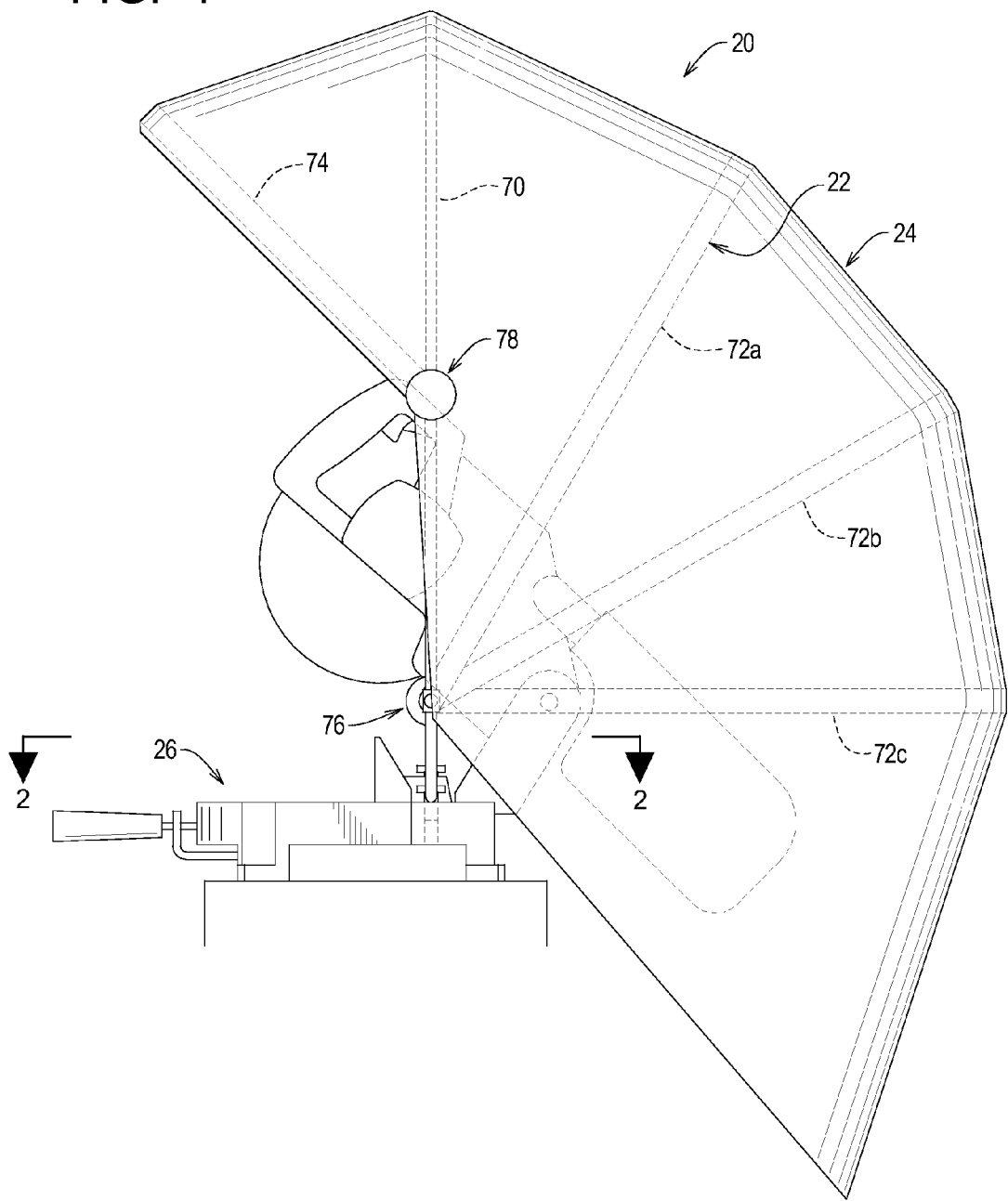
FIG. 1 is a side elevation view of a first example hood configured to collect waste from power equipment.

Referring initially to FIG. 1 of the drawing, depicted at FIG. 1 therein is a first example hood 20 constructed in accordance with, and embodying, the principles of the present invention. The first example hood 20 comprises a frame structure 22 and a hood member 24. The frame structure 22 supports the hood member 24 in a desired orientation relative to a power saw 26.

The power saw 26 does not form a part of the present invention; the example power saw 26 is a mitre saw and is illustrated by way of example only. The hood 20 may be adapted to work with other power equipment such as wood or metal lathes, planers, table saws, tile saws, or the like. The example power saw 26 will be described herein only to that extent necessary for a complete understanding of the hood 20 of the present invention.

The example power saw 26, and similar power equipment, directs waste, is such as sawdust, in a stream that extends primarily in a rearward direction, but incidental waste can be carried in other directions as well. The example hood 20 is supported by the power saw 26 in the desired orientation above, behind, to each side, and slightly below the example power saw 26. The operator stands in front of the example power saw 26 to cut wood or the like in a conventional manner. In the desired orientation, the hood 20 collects the primary waste stream and much of the incidental waste created by the power saw 26.

Figure 2:
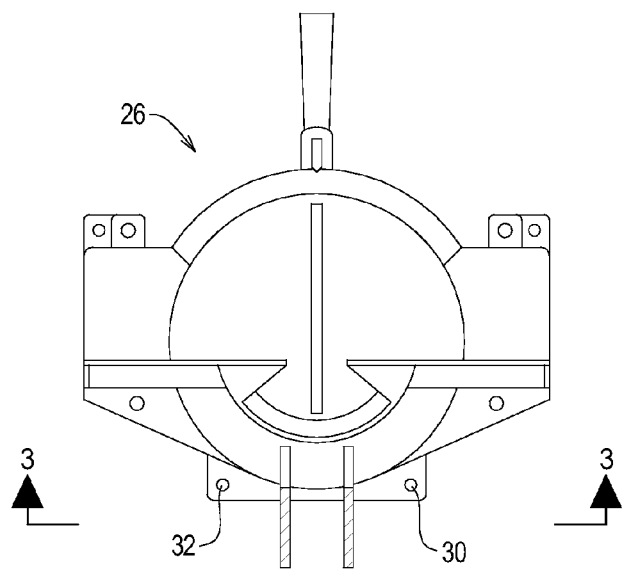
FIG. 2 is a top plan view of a portion of the power equipment depicted in FIG. 1.
Figure 3:
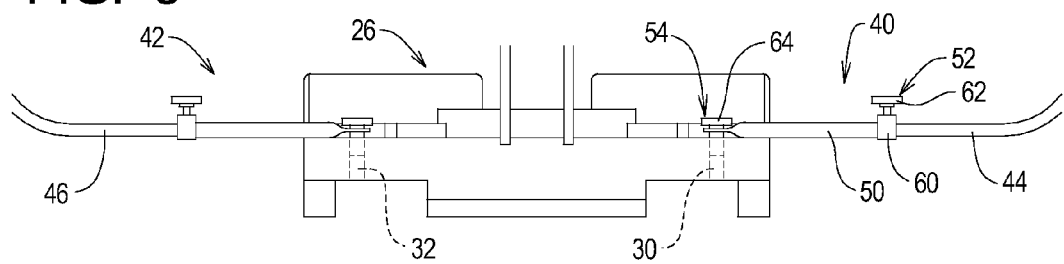
FIG. 3 is a partial, front elevation view of an example mounting system for mounting the first example hood to the power equipment depicted in FIG. 1.

Referring now to FIG. 2, it can be seen that the example power saw 26 defines first and second mounting holes 30 and 32. The example hood 20 comprises first and second mounting assemblies 40 and 42 adapted to engage the holes 30 and 32, respectively, to support the hood 20 in the desired orientation. Most power equipment like the power saw 26 will define a pair of mounting holes similar to the holes 30 and 32, but the relative spacing between and sizes of these mounting holes may differ from type to type and from manufacturer to manufacturer of the power equipment. The example first and second mounting assemblies 40 and 42 are adjustable to accommodate different types and brands of power equipment defining different spacing and sizes of mounting holes.

Figure 7:
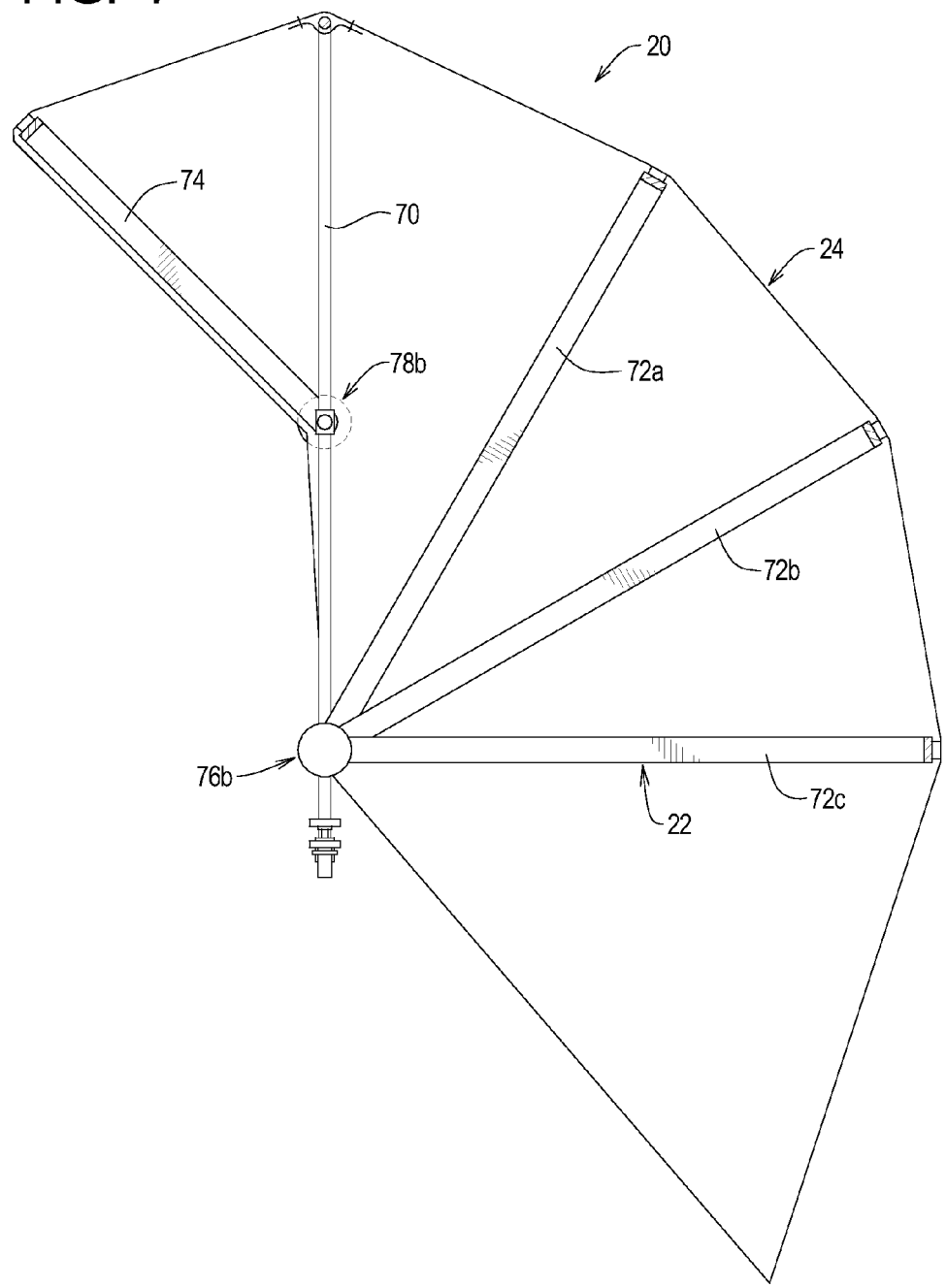
FIG. 7 is a side elevation section view of the frame structure and fabric portion of the first example hood in the extended configuration.
Figure 27:
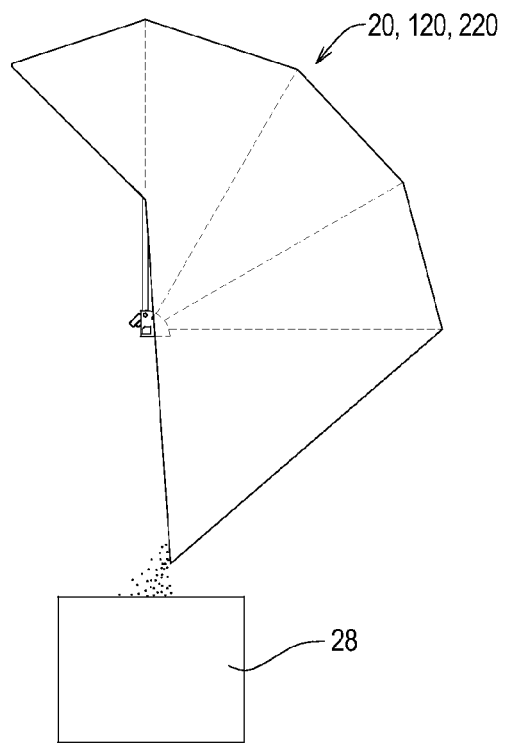
FIG. 27 is a side elevation view illustrating how any of the example hoods may be used to collect and direct waste.
Figure 28:
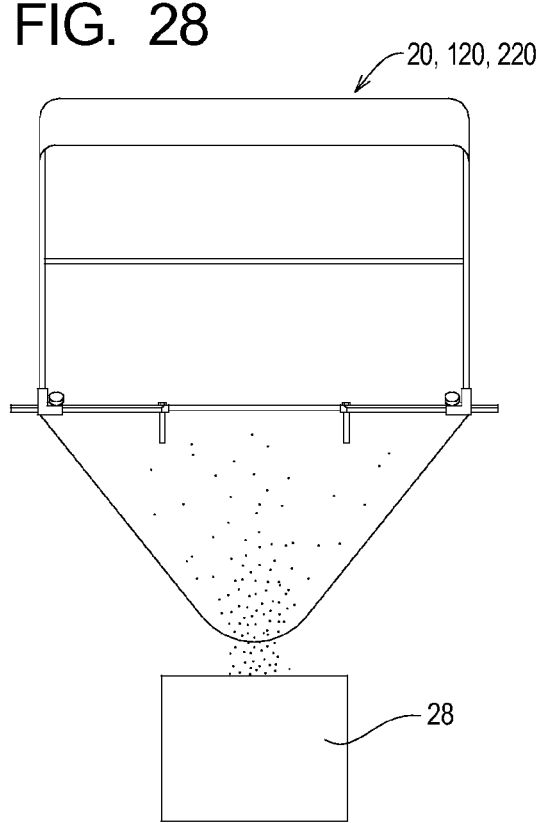
FIG. 28 is a front elevation view illustrating how any of the example hoods may be used to collect and direct waste.

Additionally, the example hood 20 is reconfigurable between a collapsed configuration (FIGS. 5 and 6) and an extended configuration (FIGS. 1, 4, and 7). In particular, the frame structure 22 of the hood 20 may be placed in the collapsed configuration when not in use or for storage, on or apart from the power saw 26. The example hood member 24 is a flexible fabric sheet that folds into a substantially flat configuration when the hood 20 is in the collapsed configuration. The frame structure 22 of the hood 20 is typically placed in the extended configuration to collect waste in a container 28 as generally shown in FIGS. 27 and 28. The example hood member 24 is stretched out in a full configuration when the hood 20 is in the extended configuration.

With the hood member 24 in the full configuration, the hood member 24 also prevents rain or the like from reaching the power saw 26. The hood 20 thus also protects the power saw 26 from the elements.

With the foregoing general understanding of the construction and operation of the first example hood 20, the details of construction and operation of the first example hood 20 will now be described in further detail.

Referring initially to FIGS. 3, 6, 8, and 9 of the drawing, the mounting assemblies 40 and 42 will now be described in further detail. FIG. 6 illustrates that the frame structure 22 defines first and second support portions 44 and 46, and the example mounting assemblies 40 and 42 are movably or adjustably supported by the support portions 44 and 46. As perhaps best shown in FIG. 9, the example support portions 44 and 46 are hollow tubes defining upper guide surfaces 44a and 46a and lower guide surfaces 44b and 46b.

The example mounting assemblies 40 and 42 are identical. Accordingly, only the first example mounting assembly 40 will be described herein in detail, with the understanding that the explanation of the first example mounting assembly 40 also applies to the second mounting assembly 42. However, in an alternate example of a hood of the present invention, one mounting assembly could be fixed relative to one of the support portions 44 or 46 and one mounting assembly could be movable or adjustable relative to the other of the support portions 44 or 46.

The example mounting assembly 40 comprises a mounting member 50, a to lock assembly 52, and a post assembly 54.

Figure 8A:
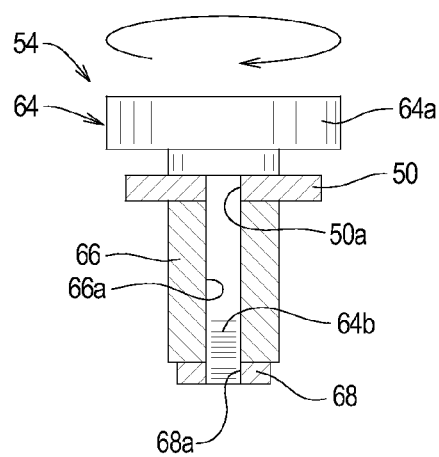
FIGS. 8A and 8B are section views taken along lines 8-8 in FIG. 6 depicting a mounting assembly of the first example hood in contracted and expanded configurations, respectively.
Figure 8B:
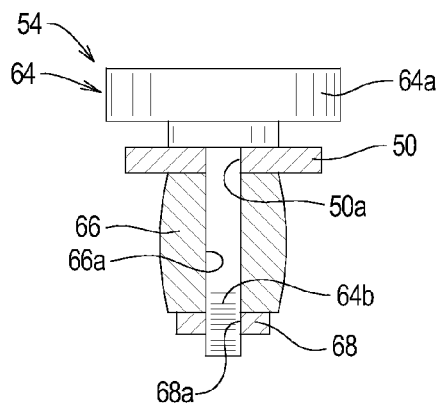
Figure 9:
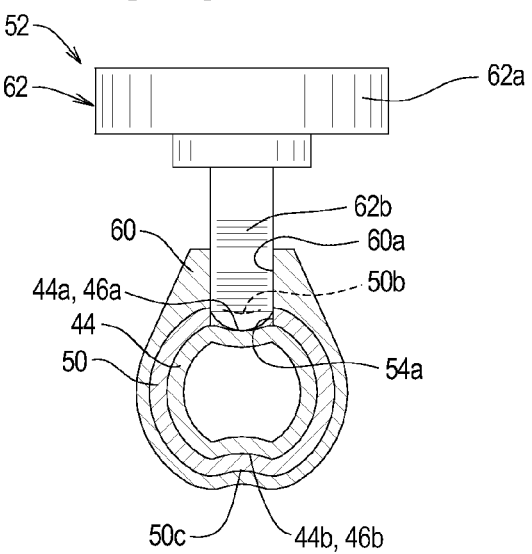
FIG. 9 is a section view taken along lines 9-9 in FIG. 6 depicting a extension lock assembly of the first example hood in a locked configuration.

The mounting member 50 is a hollow tube sized and dimensioned to receive (or be received by) the support portion 44 of the frame structure 22 in a manner that allows relative axial movement between the mounting member 50 and the support portion 44 of the frame structure 22. In particular, FIGS. 8A and 8B illustrate that the mounting member 50 defines a post opening 50a, while FIG. 9 illustrates that the mounting member 50 defines upper and lower guide surfaces 50b and 50c and a mounting opening 50d. The upper and lower guide surfaces 50b and 50c conform to the upper and lower guide surfaces 44a and 44b on the support portion 44. The example guide surfaces 44a, 44b and 50b, 50c engage each other to allow longitudinal movement of the mounting member 50 relative to the support portion 44 but to prevent axial rotation of the mounting member relative to the support portion 44.

FIG. 9 illustrates that the lock assembly 52 comprises a collar 60 and a lock screw member 62. The collar 60 defines a threaded opening 60a. The lock screw member 62 defines a handle 62a and a threaded shaft 62b. FIG. 9 further illustrates that the collar 60 is located relative to the mounting member 50 such that the threaded shaft 62b of the lock screw member 62 extends through the threaded opening 60a in the collar 60 and through the lock opening 54a in the mounting member 50. Using the handle 62a, the lock screw member 62 can be rotated to force the shaft 62b against the support portion 44, thereby fixing a location of the support member 50 relative to the support portion 44.

FIGS. 8A and 8B illustrate that the post assembly 54 comprises post screw member 64, a resilient member 66, and a threaded member 68. The post screw member 64 defines a handle 64a and a threaded shaft 64b. The resilient member 66 defines a through-hole 66a. The threaded member 68 defines a threaded opening 68a. FIGS. 8A and 8B further illustrate that the threaded shaft 64b of the post screw member 64 extends through the mounting opening 50a in the mounting member 50 and the through-hole 66a in the resilient member 66 and threadingly engages the post screw member 64. Using the handle 64a, the post screw member 64 can be rotated to pull the threaded member 68 against the resilient member 66, compressing the resilient member 66 from a substantially cylindrical condition (contracted configuration shown in FIG. 8A) to an expanded condition (expanded configuration shown in FIG. 8B).

The mounting assemblies 40 and 42 are used as follows to mount the hood 20 onto a piece of power equipment such as the power saw 26. Initially, the post assemblies 54 are loosened such that the post assemblies 54 are in the contracted configuration as shown in FIG. 8A. The lock assemblies 52 are also loosened to place the lock assemblies 52 in the unlocked position, thereby allowing movement of the mounting members 50 relative to one or both of the support portions 44 and 46.

One or both of the mounting assemblies 40 and 42 are then adjusted such that a distance between the post assemblies 54 is substantially the same as a distance between the mounting holes 30 and 32. The post assemblies 54 are then inserted into the mounting holes 30 and 32 formed in the power saw 26.

The post assemblies 54 are then tightened to place the resilient members 66 into the expanded condition and thus the post assemblies 54 in the expanded configuration shown in FIG. 8B. In this expanded configuration, the resilient members 66 frictionally engage the power saw 26, thereby securing the mounting members 50 to the power saw 26.

The lock assemblies 52 are then tightened, causing the lock screw members 62 to engage support portions 44 and 46. The lock assemblies 52 are then in a locked configuration (FIG. 9) in which the mounting members 50 are secured to the support portions 44 and 46.

Turning now to FIGS. 1, 4-7, and 10-12, the construction and operation of the example frame structure 22 will now be described in further detail. The example frame structure 22 comprises a main frame member 70, one or more rear brace members 72, one or more front brace members 74, one or more lower lock assemblies 76, and one or more upper lock assemblies 78. The example frame structure 22 comprises two lower lock assemblies 76a and 76b and two upper lock assemblies 78a and 78b. The lower lock assemblies 76a and 76b are or may be the same, and the upper lock assemblies 78a and 78b also are or may be the same. The main frame member 70 and brace members 72 and 74 define, respectively, at least one arm portion 71a, 73a, and 75a and a cross portion 71b, 73b and 75b. Typically, the brace members 70, 72, and 74 define two arm portions 71a, 73a, and 75a connected by the cross portions 71b, 73b, and 75b.

The example main frame member 70 is a relatively rigid hollow tube bent in a U-shape, with the support portions 44 and 46 extending inwardly from the ends of the U. The example rear brace members 72 are relatively rigid flat members also bent into a U-shape. The distances between the ends of the U's formed by the rear brace members 72 are different to allow the brace members 72 to nest within each other as shown by FIGS. 5 and 6. Three rear brace members 72a, 72b, and 72c are used by the example hood 20. The example front brace member 74 is similarly formed by rigid flat members bent into a U-shape, with the lengths of the arm portions of the U being shorter than those of the rear brace members 72.

The lower lock assembly 76 comprises an anchor member 80, a screw member 82, a handle member 84, a proximal spacer 86, and a plurality of intermediate spacers 88. The example lower lock assembly 76 comprises two intermediate spacers 88a and 88b. The upper lock assembly 78 comprises an anchor member 90, a screw member 92, a handle member 94, and a proximal spacer 96. The lower and upper lock assemblies 76 and 78 are similar in construction and operation, and only the lower lock assembly 76 will be described in detail.

Figure 10:
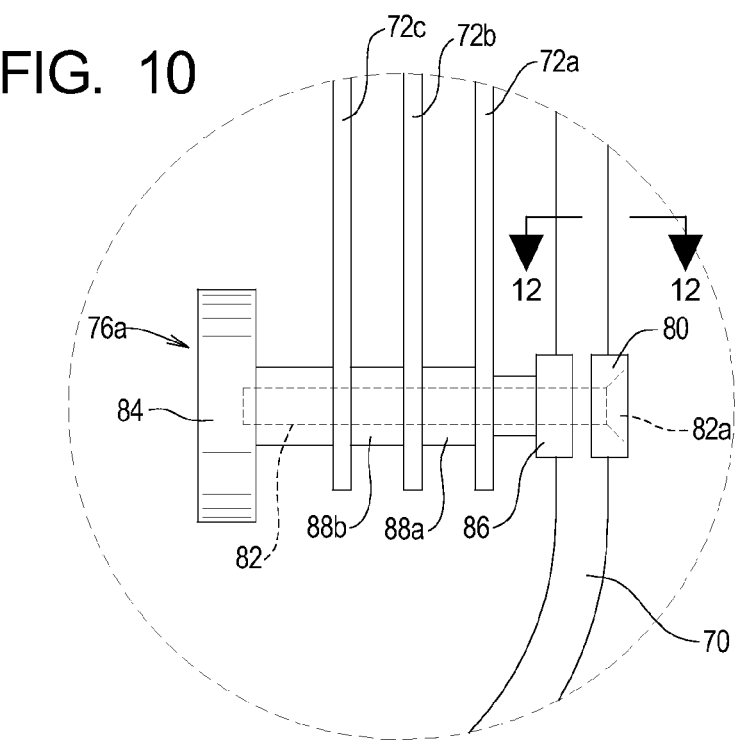
FIG. 10 is a detail view depicting a hood lock assembly of the first example hood.
Figure 11:
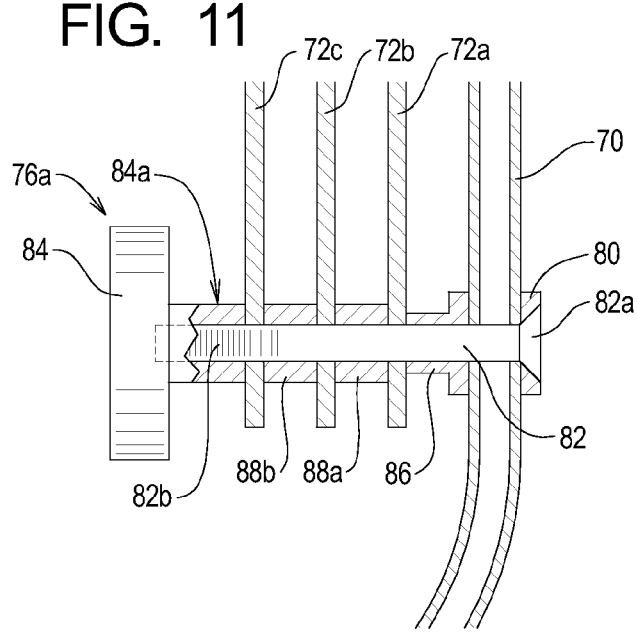
FIG. 11 is a section view of the hood lock assembly of the first example hood as depicted in FIG. 10.
Figure 12:
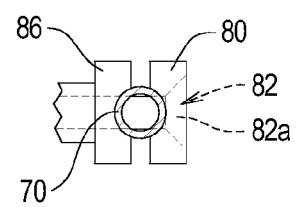
FIG. 12 is a section view taken along lines 12-12 in FIG. 10.
Figure 13:
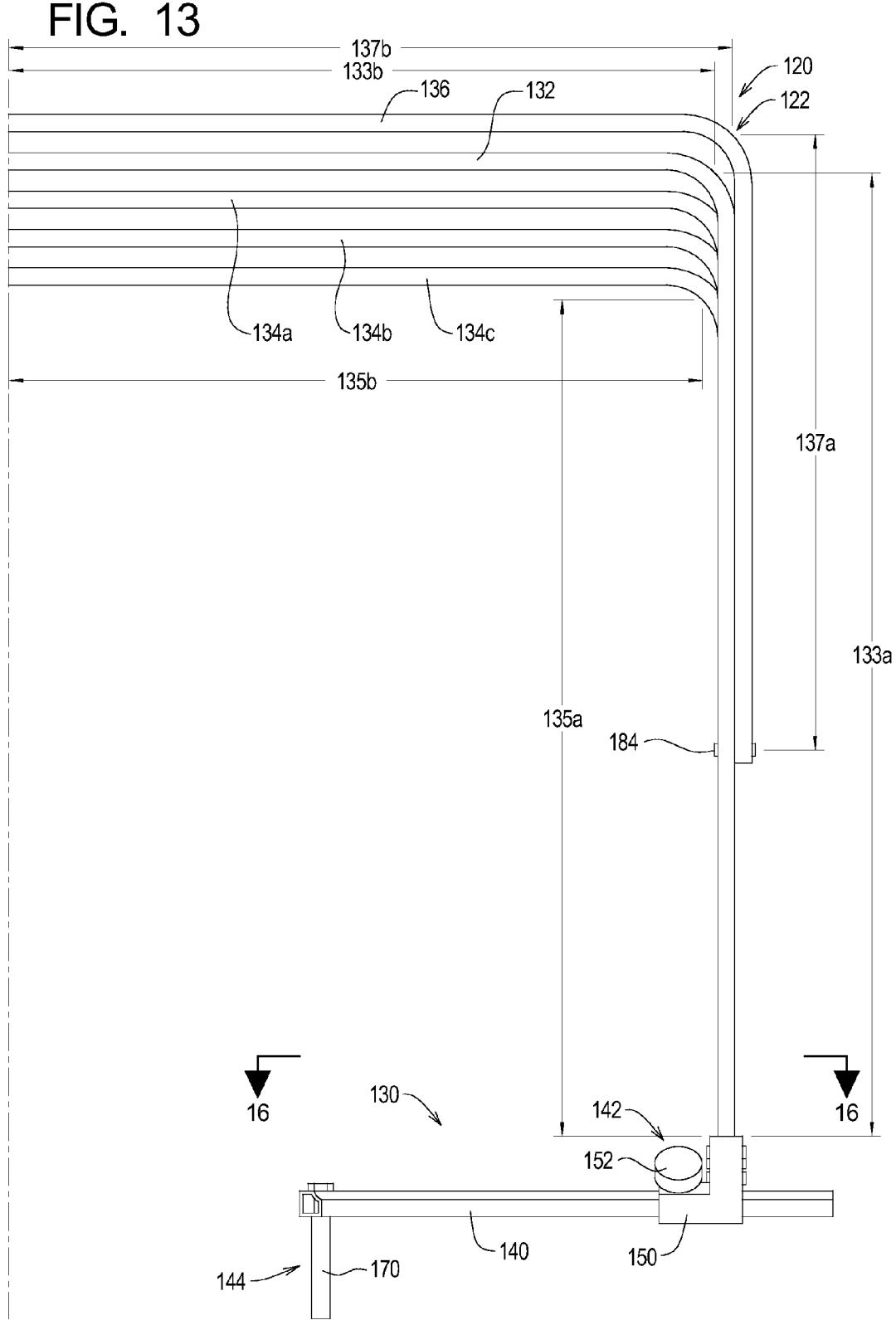

As best shown in FIGS. 10-12, the screw member 82 extends through the anchor member 80, the main frame member 70, the proximal spacer 86, the first rear brace member 72a, the first intermediate spacer 88a, the second rear brace member 72b, the second intermediate spacer 88b, the third rear brace member 72c, and into the handle member 84. A head portion 82a of the screw member 82 prevents the screw member 82 from passing through the anchor member 80. A threaded portion 82b of the screw member 82 is threadingly engaged with a threaded portion 84a of the handle member 84.

Loosening the screw member 82 by turning the handle member 84 reduces friction between the various components of the lower lock assembly 76, allowing the rear brace members 72 to rotate relative to the main frame member 70. Tightening the screw member 82 clamps the various components of the lock assembly 76 together, increasing friction between the handle member 84, the spacers 86, 88 and the main frame member 70 and rear brace members 72. When the screw member 82 is tightened, movement of the rear brace members 72 relative to the main frame member 70 is substantially prevented.

The lower lock assembly 76 thus allows the rear brace members 72 to be rotated downwardly and rearwardly into a splayed configuration as shown in FIG. 7. Similarly, the upper lock assembly 78 allows the front brace member 74 to be rotated downwardly and forwardly into a bill configuration as shown in FIG. 7. When the rear brace members 72 are in the splayed configuration and the front brace member 74 is in the bill configuration, the hood 20 is in the extended configuration. To place the hood in the collapsed configuration, the rear brace members 72 and the front brace members 74 are rotated upwardly such that they are substantially parallel and coplanar as shown in FIGS. 5 and 6.

Referring now to FIGS. 13-22, depicted therein is a second example hood 120 constructed in accordance with, and embodying, the principles of the present invention. The second example hood 120 comprises a frame structure 122 and a hood member (not shown). The hood member used by the second example hood 120 may be substantially the same as the example hood member 24 described above.

The frame structure 122 is adapted to support the hood member in a desired orientation relative to a piece of equipment (not shown). The piece of equipment may be a power saw such as the power saw 26 described above, or may be another piece of equipment such as wood or metal lathes, planers, table saws, tile saws, or the like.

The example hood 120 is supported by the piece of equipment in the desired orientation above, behind, to each side, and slightly below the example piece of equipment. The operator stands in front of the example piece of equipment to perform an action such as cutting wood. In the desired orientation, the hood 120 collects a primary waste stream generated by the piece of equipment and much of the incidental waste created by the piece of equipment.

The example hood 120 comprises a pair of mounting assemblies 130, a main frame member 132, a plurality of rear frame members 134, and a front frame member 136. The mounting assemblies 130 are adapted to engage holes in the piece of equipment to support the hood 120 in the desired orientation. For clarity, only one of the two mounting assemblies 130 is depicted in FIGS. 13-22; the other mounting assembly may be fixed or may be adjustable like the mounting assembly 130 illustrated in the drawing. The main and rear frame members 132 and 134 extend from the mounting assemblies 130, while the front frame member 136 extends from the main frame member 132.

The main frame member 132, rear frame members 134, and front frame member 136 define, respectively, at least one arm portion 133a, 135a, and 137a and a cross portion 133b, 135b and 137b. Typically, the frame members 132, 134, and 136 define two arm portions 133a, 135a, and 137a connected by the cross portions 133b, 135b and 137b.

As generally described above most power equipment defines a pair of mounting holes similar to the holes 30 and 32 described above, but the relative spacing between and sizes of these mounting holes may differ from type to type and from manufacturer to manufacturer of the power equipment. The example mounting assemblies 130 are adjustable to accommodate different types and is brands of power equipment defining different spacing and sizes of mounting holes.

Figure 14:
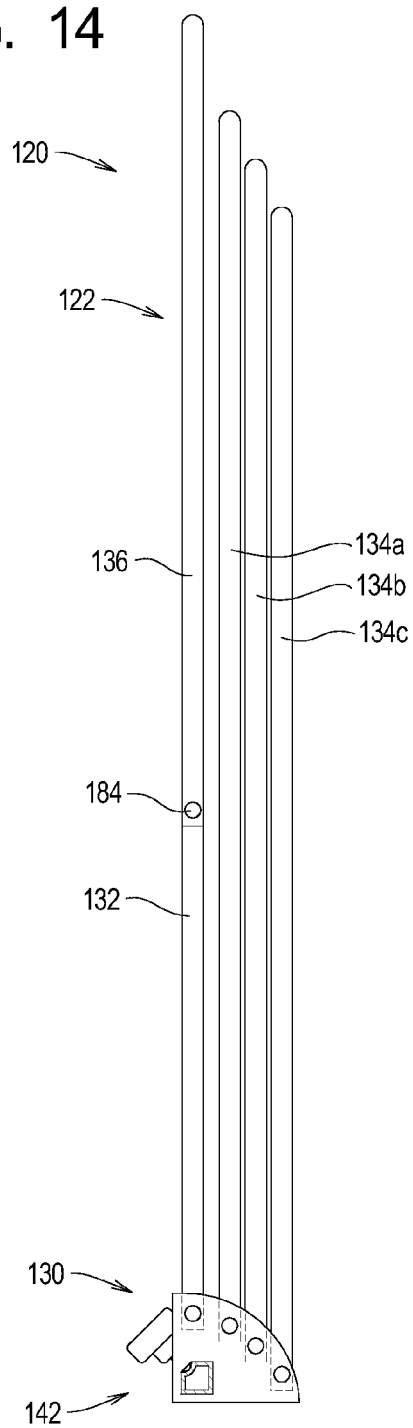
FIG. 14 is a side elevation view of a support structure of the second example hood in a collapsed configuration.
Figure 15:
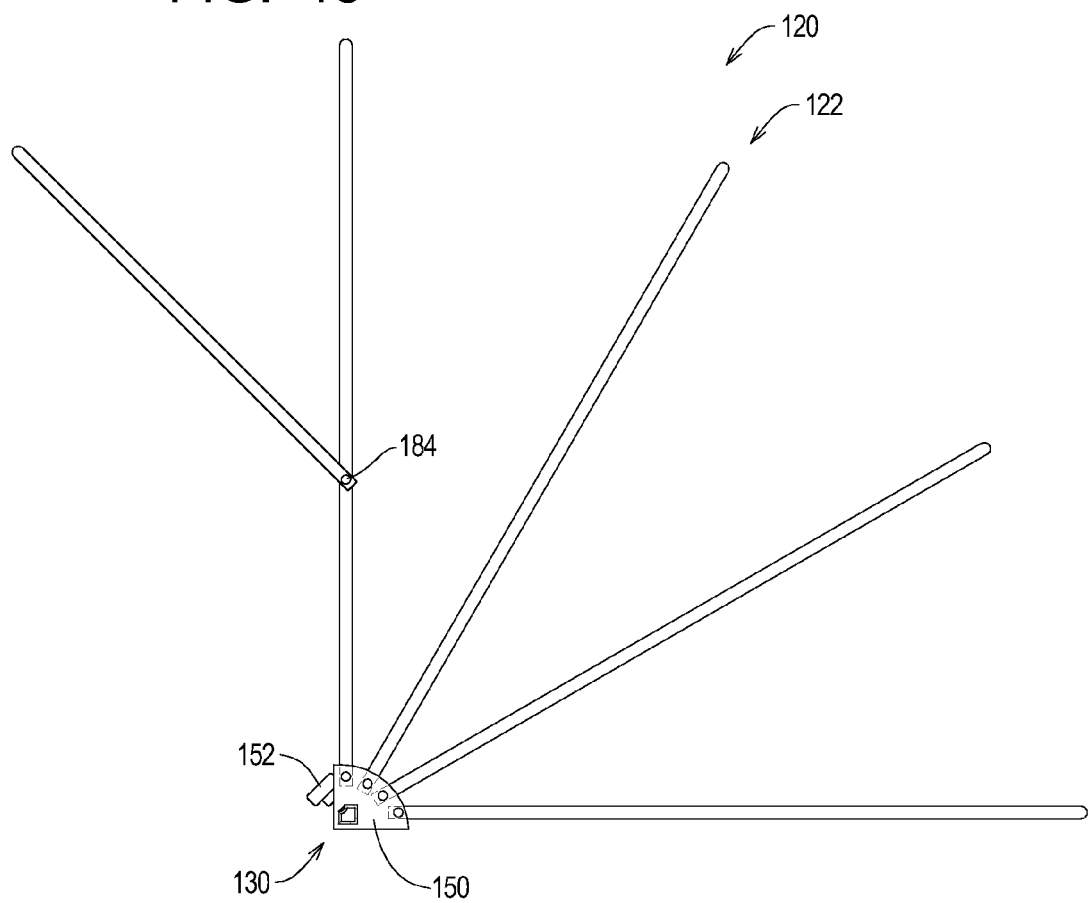
FIG. 15 is a side elevation view of the support structure of the second example hood in an extended configuration.

Like the first example hood 20 described above, the second example hood 120 is reconfigurable between a collapsed configuration (FIGS. 13 and 14) and an extended configuration (FIG. 15). The frame structure 122 of the hood 120 may be placed in the collapsed configuration when not in use or for storage. Again, the example hood member used by the example hood 120 is or may be a flexible fabric sheet that folds into a substantially flat configuration when the hood 120 is in the collapsed configuration.

With the foregoing general understanding of the construction and operation of the second example hood 120, the details of construction and operation of the second example hood 120 will now be described in further detail.

Figure 16:
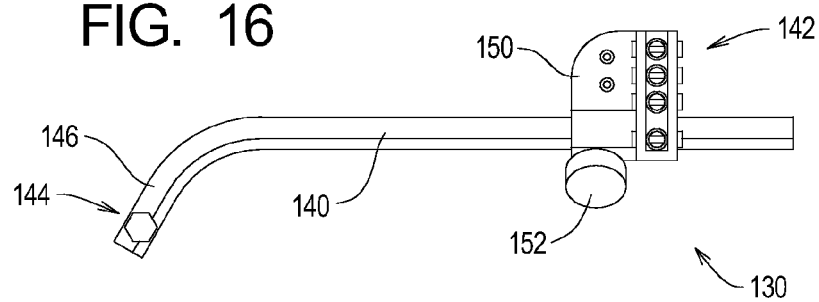
FIG. 16 is a top plan section view taken along lines 16-16 in FIG. 13 illustrating a hinge connector of the second example hood.
Figure 17:
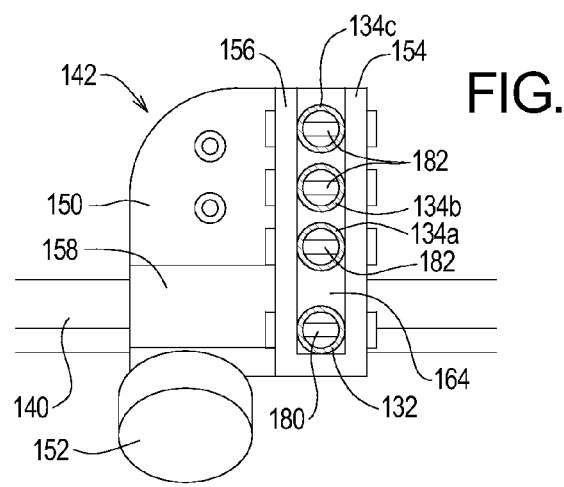
FIG. 17 is a top plan section view of the hinge connector of the second example hood.
Figure 18:
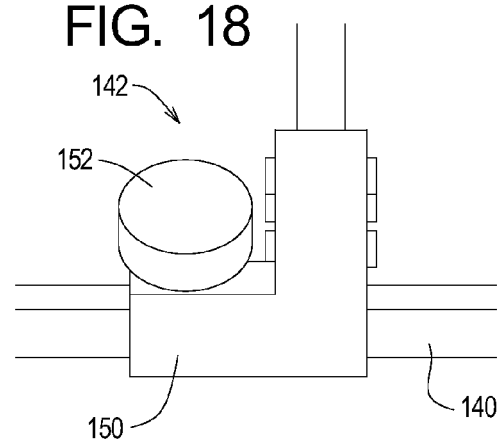
FIG. 18 is an elevation view of the hinge connector of the second example hood.
Figure 19:
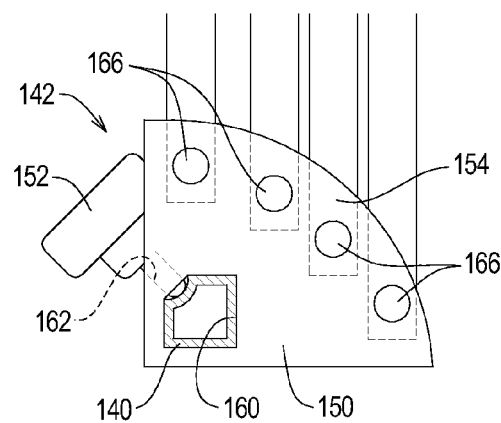
FIG. 19 is a first side elevation view of the hinge connector of the second example hood.
Figure 20:
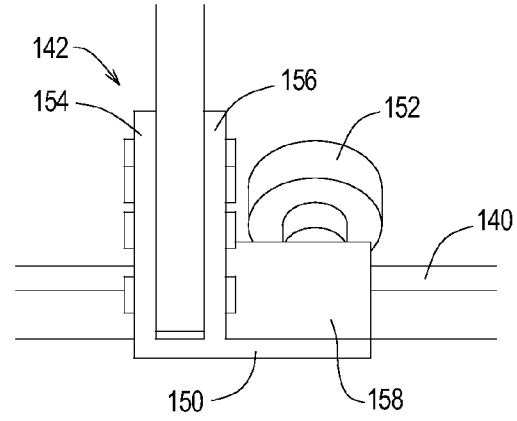
FIG. 20 is an elevation view of the hinge connector of the second example hood.
Figure 21:
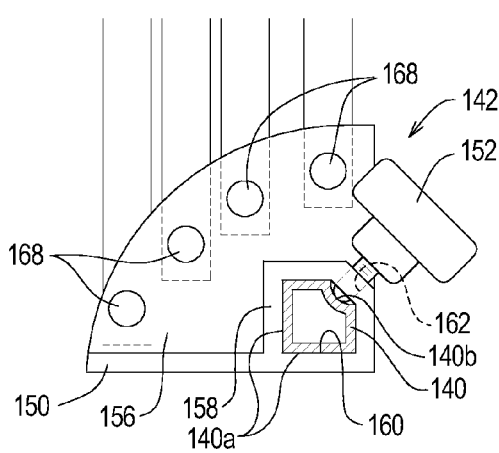
FIG. 21 is a second side elevation view of the hinge connector of the second example hood.

The mounting assemblies 130 each comprise a support bar 140, a base assembly 142, and a post assembly 144. As perhaps best shown in FIGS. 14, 15, 19, and 21, the example support bars 140 are hollow tubes defining at least one guide surface 140*a* and at least one lock surface 140*b*. The base assemblies 142 are supported for movement along the support bars 140. The post assemblies 144 are mounted on a distal end of the support bar 140. Referring to FIG. 16, it can be seen that the example support bars 140 comprises an angled portion 146 that spaces the base members base assemblies 142 rearwardly from the post assemblies 144.

The base assemblies 142 each comprise a base member 150 and a lock screw 152. The base member 150 defines first and second pivot portions 154 to and 156 and a guide portion 158. The guide portion 158 defines a guide opening 160 and a lock opening 162. The pivot portions 154 and 156 define a pivot slot 164. One of the support bars 140 extends through each of the guide openings 160, and the lock opening 162 opens towards the lock surface 142. A first array of pivot openings 166 is formed in the first pivot portion 154, while a second array is of pivot openings 168 is formed in the second pivot portion 156.

The lock screw 152 extends through the lock opening 162. Rotating the lock screw 152 displaces the lock screw 152 relative to the base member 150. Tightening the lock screw 152 against the lock surface 140*b* on the support bar 140 inhibits relative movement between the base member 150 and the support bar 140. Loosening the lock screw 152 allows the base member 150 to be moved along the support bar 140.

Figure 22:
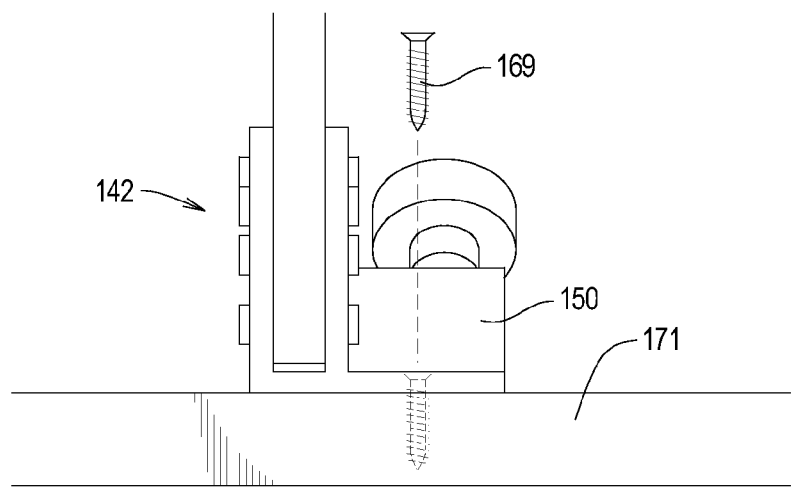
FIG. 22 is an exploded view of the hinge connector of the second example hood.

FIG. 22 illustrates that an optional screw 169 may be driven through the base portion 150 and into a support surface 171 such as a table to rigidly connect the base member 150 at a desired location on the support surface 171.

The post assemblies 144 may be any structure capable of engaging the mounting holes on the piece of equipment on which the hood 120 is to be mounted. The post assemblies 144 may be a simple post member 170 sized and dimensioned to engage the mounting holes. Alternatively, the adjustable diameter post assemblies 54 described above may be used as the post assemblies 144.

Turning now to FIGS. 14-21, it can be seen that the main frame member 132 and rear frame members 134 are pivotably connected to the base member 150. In particular, a first pivot member 180 extends between an uppermost aligned pair of pivot holes 166 and 168 formed in the pivot portions 154 and 156 and through the lower end of the main frame member 132. The main frame member 132 may thus pivot relative to the base member 150 as shown by a comparison of FIGS. 14 and 15.

Similarly, an intermediate pivot member 182 extends between the other aligned pairs of pivot holes 166 and 168 formed in the pivot portions 154 and 156 and through the lower ends of the rear frame members 134, allowing the rear frame members 134 also to pivot relative to the base member 150 as shown by a comparison of FIGS. 14 and 15.

As perhaps best shown in FIG. 15, pivot pins 184 extends through the ends of the front frame member 136 and the upright portions of the main frame member 132. These pivot pins 184 allow the front frame member 136 to rotate relative to the front frame member 136 as shown by a comparison of FIGS. 14 and 15.

Figure 23:
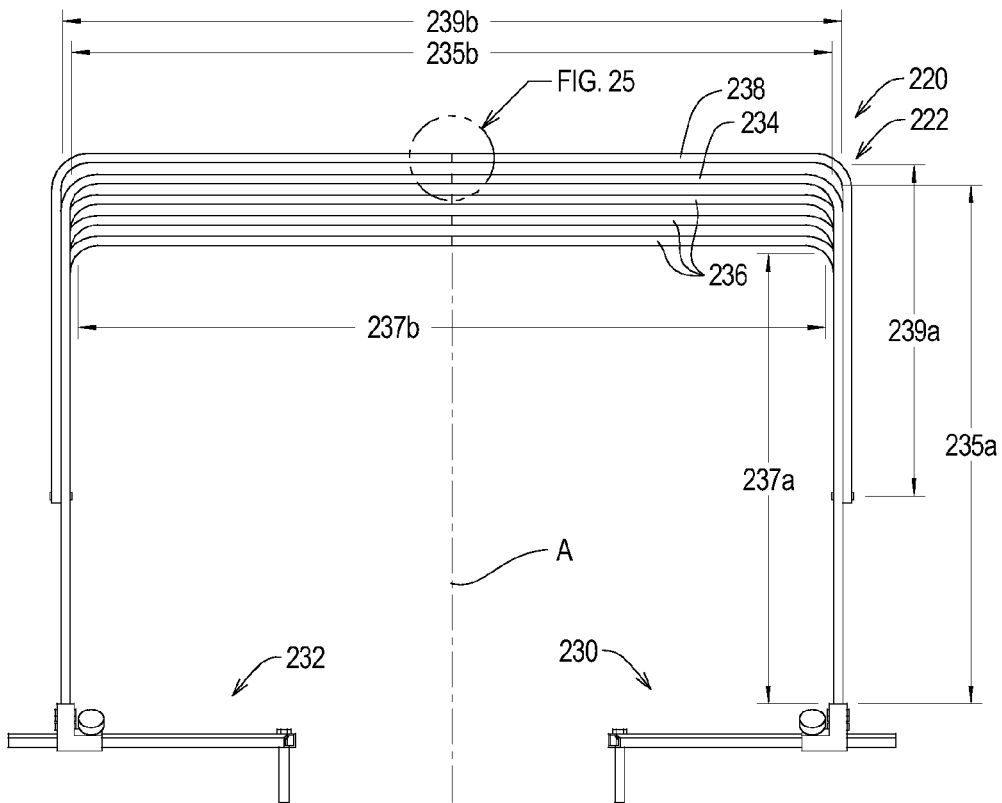
Figure 24:
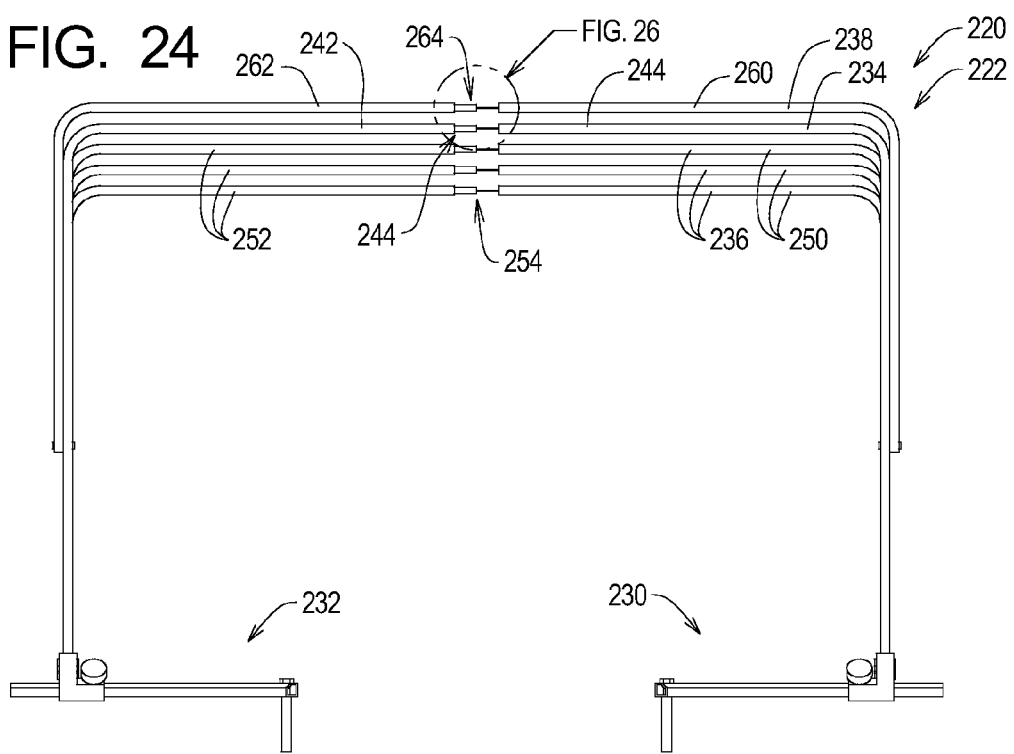
FIG. 24 is an elevation view of the support structure of the third example hood being separated to form a storage/shipping configuration.

Turning now to FIGS. 23 and 24, depicted therein is a third example hood 220 constructed in accordance with, and embodying, the principles of the present invention. The third example hood 220 comprises a frame structure 222 and a hood member (not shown). The hood member used by the second example hood 220 may be substantially the same as the example hood member 24 described above.

The frame structure 222 is adapted to support the hood member in a desired orientation relative to a piece of equipment (not shown). The piece of equipment may be a power saw such as the power saw 26 described above, or may be another piece of equipment such as wood or metal lathes, planers, table saws, tile saws, or the like.

The example hood 220 is supported by the piece of equipment in the desired orientation above, behind, to each side, and slightly below the example piece of equipment. The operator stands in front of the example piece of equipment to perform an action such as cutting wood. In the desired orientation, the hood 220 collects a primary waste stream generated by the piece of equipment and much of the incidental waste created by the piece of equipment.

Like the second example hood 120 described above, the third example hood 220 comprises a pair of mounting assemblies 230 and 232, a main frame assembly 234, a plurality of rear frame assemblies 236, and a front frame assembly 238. The mounting assemblies 230 are adapted to engage holes in the piece of equipment to support the hood 220 in the desired orientation. The main and rear frame assemblies 234 and 236 extend from the mounting assemblies 230 and 232, while the front frame assembly 238 extends from the main frame member 234.

The main frame member 234, rear frame members 236, and front frame member 238 define, respectively, at least one arm portion 235*a*, 237*a*, and 239*a* and a cross portion 235*b*, 237*b* and 239*b*. Typically, the frame members 234, 236, and 238 define two arm portions 235*a*, 237*a*, and 239*a* connected by the cross portions 235*b*, 237*b* and 239*b*.

As shown by a comparison of FIGS. 23 and 24, the frame assemblies 234, 236, and 238 are formed by two separate pieces that may be separated along a center plane A as shown in FIG. 23. The frame assemblies 234, 236, and 238 may thus be further broken down into a shipping configuration.

In particular, the main frame assembly 234 comprises a first main frame member 240, a second main frame member 242, and a main connector assembly 244. The rear frame assemblies 236 each comprise a first rear frame member 250, a second rear frame member 252, and a rear connector assembly 256. The front frame assembly 238 comprises a first front frame member 260, a second front frame member 262, and a front connector assembly 264.

The connector assemblies 244, 254, and 264 may be any structure capable of detachably attaching the frame members to form a relatively rigid structure. For example, the end of one frame member may be hollow, and the end of the other frame member may be narrowed to define a point that extends into the hollow end of the other frame member to form a friction fit.

The example connector assemblies 244, 254, and 264 are elastic connector assemblies that allow the frame members to be reconfigured into the shipping configuration but still keep the frame members together. The example connector assemblies 244, 254, and 264 are the same, and only the front connector assembly 264 will be described with reference to FIGS. 25 and 26.

Figure 25:
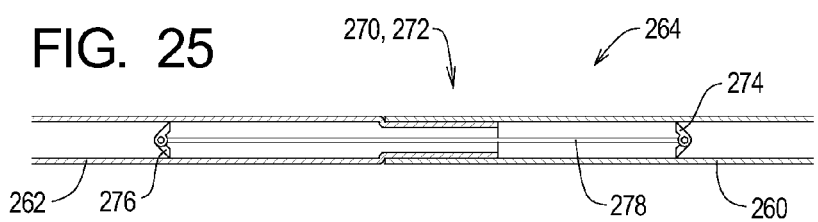
FIG. 25 is a detail, section view of a elastic connector shown by line 25 in FIG. 23.
Figure 26:
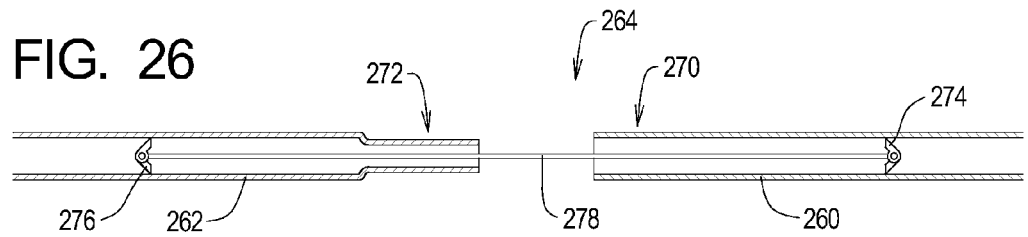
FIG. 26 is a detail, section view of the elastic connector shown by line 26 in FIG. 24.

As shown in FIG. 25, the front connector assembly 264 comprises a wide hollow end 270 of the frame member 260, a narrow hollow end 272 of the frame member 262, first and second anchor members 274 and 276, and an elastic member 278 extending between the anchor members 274 and 276. The wide hollow end 270 is sized and dimensioned to snugly receive the narrow hollow end 272 to form a friction fit that connects the frame members 260 and 262 as depicted in FIG. 25. However, when a force is applied to separate the frame members 260 and 262, the friction fit can be overcome, allowing the ends 270 and 272 to be disengaged as shown in FIG. 26. The anchors 274 and 276 maintain the ends of the elastic member 278 within the frame members 260 and 262, however. Accordingly, the frame members 260 and 262 cannot be completely separated from each other.

However, the elastic member 278 allows the frame members 260 and 262 to be folded back into the shipping configuration. The third example hood 220 can thus be shipped and stored in a much smaller form factor than the first and second example hoods 20 and 120.

The scope of the present invention should be determined by the claims to be appended hereto and not the foregoing detailed description of examples of the invention.

What is claimed is:

1. A hood assembly for woodworking equipment defining first and second mounting holes, the hood assembly comprising:
    a main frame member;
    at least one secondary frame member, where each secondary frame member is supported relative to the main frame member;
    a hood member supported by the main frame member and the at least one secondary frame member; and
    first and second mounting posts, where
       the main frame member is supported by the first and second mounting posts, and
       the first and second mounting posts are adapted to be received within the first and second mounting holes such that the main frame member and the at least one secondary frame member support the hood member such that the hood member is adapted to extend over at least a portion of the woodworking equipment; and
    at least one locking assembly for securing the first post member at a desired location relative to the main frame member such that a distance between the first and second post members is substantially the same as a distance between the first and second mounting holes.

2. A hood assembly as recited in claim 1, further comprising first and second spacing members, where:
    the first and second spacing members support the first and second mounting posts, respectively; and
    the main frame member movably supports the first and second mounting posts.

3. A hood assembly as recited in claim 2, further comprising first and second locking assemblies for securing the first and second spacing members at desired locations relative to the main frame member such that a distance between the first and second mounting posts is substantially the same as a distance between the first and second mounting holes.

4. A hood assembly as recited in claim 1, further comprising a post assembly comprising the mounting post, where the post assembly may be reconfigured between a contracted configuration and an expanded configuration.

5. A hood assembly as recited in claim 1, in which the at least one secondary frame member is rotatably attached relative to the main frame member to allow the at least one secondary frame member to be moved between first and second positions relative to the main frame member.

6. A hood assembly as recited in claim 1, in which a plurality of secondary frame members are supported for rotation relative to the main frame member to allow each of the plurality of secondary frame members to be moved between first and second positions relative to the main frame member.

7. A hood assembly as recited in claim 6, in which:
    at least one secondary frame member rotates in a first direction relative to the main frame member; and
    at least one secondary frame member rotates in a second direction relative to the main frame member.

8. A hood assembly as recited in claim 1, in which:
    the main frame member comprises first and second main frame member portions, where the first and second main frame member portions may be detachably attached to form the main frame member; and
    each of the at least one secondary frame members comprises first and second secondary frame member portions, where the first and second frame member portions may be detachably attached to form the at least one secondary frame members; wherein
    when the first and second main frame members are detached from each other and the first and second secondary frame members are detached from each other, the hood assembly may be placed in a folded configuration.

9. A hood assembly as recited in claim 1, further comprising first and second base members, where the main frame member and the at least one secondary frame member are rotatingly supported by the first and second base members.

10. A hood assembly as recited in claim 8, further comprising:
    first and second support bars, where
       the first and second support bars support the post members,
       the first base member slidingly engages the first support bar, and
       the second base member slidingly engages the second support bar; and
    first and second lock members, where
       the first lock member secures a location of the first support bar relative to the first base member, and
       the second lock member secures a location of the second support bar relative to the second base member.

11. A method of collecting saw dust comprising the steps of:
    providing woodworking equipment capable of generating saw dust;
    forming first and second mounting holes in the woodworking equipment;
    providing a main frame member;
    providing at least one secondary frame member;
    supporting each secondary frame member relative to the main frame member;

arranging a hood member on the main frame member and the at least one secondary frame member;
providing first and second post members;
supporting the main frame member relative to the first and second post members;
inserting the first and second post members into the first and second mounting holes such that the first and second post members are supported by the first and second mounting holes respectively;
securing the first post member at a desired location relative to the main frame member such that a distance between the first and second post members is substantially the same as a distance between the first and second mounting holes; and
with the first and second mounting posts supported by the first and second mounting holes, arranging the main frame member and the at least one secondary frame member such that the hood member extends over at least a portion of the woodworking equipment.

12. A method as recited in claim 11, further comprising the steps of:
providing first and second spacing members, where the first and second spacing members support the first and second mounting posts, respectively; and
movably supporting the first and second spacing members on the main frame member.

13. A method as recited in claim 11, in which the step of securing the first post member at a desired location relative to the main frame member comprises the step of providing first and second locking assemblies for securing the first and second spacing members at desired locations relative to the main frame member such that a distance between the first and second post members is substantially the same as a distance between the first and second mounting holes.

14. A method as recited in claim 11:
in which the step of providing the first and second post members comprises the step of providing first and second post assemblies; and
reconfiguring at least one of the first and second post assemblies between a contracted configuration and an expanded configuration.

15. A method as recited in claim 11, further comprising the step of rotatably attaching the at least one secondary frame member relative to the main frame member to allow the at least one secondary frame member to moved between first and second positions relative to the main frame member.

16. A method as recited in claim 11, in which a plurality of secondary frame members are supported for rotation relative to the main frame member, where each of the plurality of secondary frame members are moved between first and second positions relative to the main frame member.

17. A method as recited in claim 16, in which:
at least one secondary frame member rotates in a first direction relative to the main frame member; and
at least one secondary frame member rotates in a second direction relative to the main frame member.

18. A method as recited in claim 11, further comprising the steps of:
providing first and second main frame member portions;
detachably attaching the first and second main frame member portions to form the main frame member;
providing first and second secondary frame member portions;
detachably attaching the first and second frame member portions to form the at least one secondary frame member; and
when the first and second main frame members are detached from each other and the first and second secondary frame members are detached from each other, placing the hood assembly in a folded configuration.

19. A method as recited in claim 11, further comprising the steps of:
providing first and second base members; and
rotatingly supporting the main frame member and the at least one secondary frame member relative to the first and second base members.

20. A method as recited in claim 19, further comprising the steps of:
providing first and second support bars, where
the first and second support bars support the post members,
the first base member slidingly engages the first support bar, and
the second base member slidingly engages the second support bar; and
providing first and second lock members, where
the first lock member secures a location of the first support bar relative to the first base member, and
the second lock member secures a location of the second support bar relative to the second base member.

* * * * *